US012671180B2

(12) United States Patent
Khouri et al.

(10) Patent No.: US 12,671,180 B2
(45) Date of Patent: Jun. 30, 2026

(54) ANTENNA AND ASSOCIATED COUPLER FOR TRANSFERRING AN ANTENNA FUNCTION AND CORRESPONDING COMMUNICATING DEVICE

(71) Applicant: SAGEMCOM ENERGY & TELECOM SAS, Bois-Colombes (FR)

(72) Inventors: Rami Khouri, Bois-Colombes (FR); Oscar-Alberto Martinez-Rodriguez, Bois-Colombes (FR)

(73) Assignee: SAGEMCOM ENERGY & TELECOM SAS, Bois-Colombes (FR)

( * ) Notice: Subject to any disclaimer, the term of this patent is extended or adjusted under 35 U.S.C. 154(b) by 0 days.

(21) Appl. No.: 18/541,310

(22) Filed: Dec. 15, 2023

(65) Prior Publication Data

US 2024/0204407 A1 Jun. 20, 2024

(30) Foreign Application Priority Data

Dec. 16, 2022 (FR) ...................................... 2213657

(51) Int. Cl.
*H01Q 5/47* (2015.01)
*H01Q 5/307* (2015.01)

(52) U.S. Cl.
CPC ............... *H01Q 5/47* (2015.01); *H01Q 5/307* (2015.01)

(58) Field of Classification Search
CPC ................................ H01Q 5/47; H01Q 5/307
See application file for complete search history.

(56) References Cited

U.S. PATENT DOCUMENTS

2002/0154066 A1 10/2002 Barna et al.
2004/0212545 A1 10/2004 Li et al.
2013/0050036 A1 2/2013 Kashiwagi et al.
2020/0053436 A1 2/2020 Azulay et al.

FOREIGN PATENT DOCUMENTS

DE 102012112266 B3 4/2014

OTHER PUBLICATIONS

French Patent Application No. FR2213657, Search Report and Written Opinion, dated Jun. 5, 2023.
Search Report dated Jun. 5, 2023.

*Primary Examiner* — Graham P Smith
(74) *Attorney, Agent, or Firm* — Birch, Stewart, Kolasch & Birch, LLP

(57) ABSTRACT

The invention relates to an antenna of a communicating device including
- a substrate,
- a feed point of the antenna and a first grounding point intended to be connected to a ground plane;
- a metallic antenna element pattern printed on one side of the substrate, the antenna element pattern forming an open loop from the feed point to the first grounding point, the loop defining in its center a non-metallic area;
- the antenna being suitable for operating alone to radiate a radio signal or in association with a coupler disposed facing and distant from the antenna in such a way as to pick up the signal radiated by the antenna, the coupler including a metallic area complementary to the non-metallic area facing it.

8 Claims, 4 Drawing Sheets

ANTENNA AND ASSOCIATED COUPLER FOR TRANSFERRING AN ANTENNA FUNCTION AND CORRESPONDING COMMUNICATING DEVICE

CROSS REFERENCE TO RELATED APPLICATIONS

The benefit of priority to French Patent Application No. 2213657 filed Dec. 16, 2022, is hereby claimed and the disclosure is incorporated herein by reference in its entirety.

TECHNICAL FIELD

This invention relates to an antenna and an associated coupler for transferring an antenna function, in a passive manner. It also relates to a communicating device comprising such an antenna able to operate with such a coupler.

BACKGROUND

A radio device usually comprises an internal antenna (often fully integrated into the device) and a connection to an external antenna to enable switching from one antenna to the other according to the operating conditions, for example when the conditions of reception by the radio antenna are poor.

To do this, such a device comprises two separate radio channels, each channel being connected either to the internal antenna or to the connection to the external antenna. To commute from one channel to the other, a radio frequency or mechanical switch is used.

The use of these types of switch is not satisfactory.

Specifically, a radio frequency switch requires a mechanism for detecting the presence of an external connection which can prove expensive, bulky and harmful to radio performance by adding more attenuation. The detection system also poses a problem of power consumption (especially important for battery-powered devices).

Also, the incorporation of an additional non-linear element, as is the case of the radio frequency switch, is a possible cause of undesirable transmissions or noise.

The use of a mechanical switch is bulky and expensive and difficult to incorporate into a printed circuit board. The main functional drawback of this solution is the appearance of mechanical flapping in the event of faulty clamping of the antenna or of the coaxial cable. In addition, the radio path must of necessity involve the switch which gives rise to additional attenuations in performance.

Moreover, the detection systems are not very reliable and often generate a false measurement, which leads to immediate loss of communication.

SUMMARY OF THE INVENTION

The invention permits to solve at least one of the drawbacks as described above.

For this purpose, the invention according to a first aspect relates to an antenna of a communicating device, comprising a substrate, a feed point of the antenna and a first grounding point intended to be connected to a ground plane; a metallic antenna element pattern printed on one side of the substrate, the antenna element pattern forming an open loop from the feed point to the first grounding point, the loop defining in its center a non-metallic area; the antenna being suitable for operating alone to radiate a radio signal or in association with a coupler disposed facing and distant from the antenna in such a way as to pick up the signal radiated by the antenna, the coupler comprising a metallic area complementary to the non-metallic area facing it.

The invention, according to the first aspect, is advantageously completed by the following features, taken alone or in any of their technically possible combinations:

- the antenna element pattern comprises, from the feed point, a first metallic integral pattern composed of two longitudinal branches distant from one another, a transverse branch connecting the two longitudinal branches, a first longitudinal branch extending from the feed point, a second longitudinal branch extending from the transverse branch parallel to the first branch, the antenna element pattern comprising a second integral pattern extending from the first grounding point and comprises a transverse branch parallel to and distant from the transverse branch of the first integral pattern, the transverse branch of the second integral pattern ending at a distance in the vicinity of 1 to 3 mm from the second longitudinal branch of the first pattern without touching it.
- the non-metallic area is rectangular.
- the antenna comprises a second grounding point intended to be connected to a ground plane and comprises a third integral pattern extending from the second grounding point.
- the first pattern, the second pattern and the third pattern are configured to operate in the bands LTE 20 and 8.

The invention relates, according to a second aspect, to a coupler of a communicating device comprising a rectangular substrate comprising a coupling pattern printed on one side, the coupling pattern comprising a metallic area complementary to a non-metallic area of an antenna intended to be facing and distant from the coupler in such a way that the coupler picks up the signal radiated by the antenna.

The invention relates, according to a third aspect, to a communicating device comprising a first housing for housing an antenna according to the first aspect of the invention and a second housing for housing a coupler according to the second aspect of the invention, the first housing and the second housing being configured with respect to one another in such a way that the antenna and the coupler can face one another, the metallic area of the coupler then facing the non-metallic area of the antenna, the device comprising two operating modes: a first operating mode comprising the antenna on its own, for radiating a radio signal, a second operating mode comprising the antenna and the coupler for transferring a radio signal radiated by the antenna to an external antenna suitable for being connected to the coupler.

The invention, according to the third aspect, is advantageously completed by the following features, taken alone or in any of their technically possible combinations:

- the second housing is suitable for retaining the coupler facing and between 1 and 3 mm distant from the antenna.
- the coupler comprises a connector connected to the coupling pattern, the connector being suitable for being connected to an external antenna by means of a cable.
- the antenna is embedded in a cover and in which the housing for the coupler is a groove formed in the cover, the coupler being removable.

The invention has several advantages.

The coupler and the antenna are not in contact, so it is not necessary to add any additional connecting elements. This is particularly advantageous when the communicating device is a smart water meter in which watertightness is desired to be compliant with IP67 protection.

The internal antenna thus behaves as a conventional antenna when it is used alone and allows the transfer of the signal by transmitting it to the coupler when the latter is positioned facing the antenna, and without having to change radio path. The presence of a coupler in proximity to the antenna forces the latter to operate as a coupler. Thus, the useful signal is no longer radiated directly by the antenna but transmitted to a remote external antenna by way of the adjacent coupler.

The coupler and the antenna are not in direct contact which allows for electrical isolation between the two (useful in the case of electricity meters). Moreover, the transition from one operating mode to the other does not require any electronic or software action: the presence of the coupler makes it possible to transition from the mode involving internal antenna radiation to the mode involving coupling to an external antenna.

BRIEF DESCRIPTION OF THE DRAWINGS

Other features, aims and advantages of the invention will become apparent from the following description, which is purely illustrative and non-limiting, and which must be read with reference to the appended drawings on which.

In all the figures similar elements bear identical references.

DETAILED DESCRIPTION

Figure 1C:
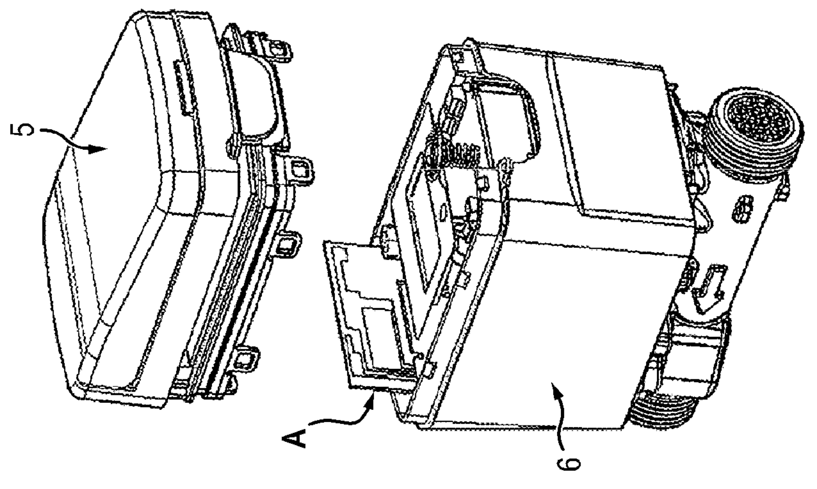
FIG. 1*a*, FIG. 1*b*, FIG. 1*c*, FIG. 1*d* and FIG. 1*e* illustrate several views of a communicating device in accordance with the invention.

FIGS. 1*a*, 1*b*, 1*c*, 1*d*, 1*e* illustrate several views of a communicating device D comprising an enclosure 1 housing an electronics card 6 along with electronic components (not visible). The enclosure 1 includes a bottom 11 and four walls 12 (two are visible in the figures) rising up from the bottom 11. The enclosure 1 defines a volume which houses the electronics. An antenna A, the so-called internal antenna, is connected to the electronics card 6 and allows the communicating device D to transmit and receive signals. As will be seen further on, the internal antenna A takes the form of a plate of overall rectangular shape. The electronics card 6 provides all the radio processing required for communication.

Such a communicating device D is for example a water meter for which regular readings must be taken remotely. More generally, it should be noted that the invention is applicable to all communicating devices.

To promote communication, the internal antenna A protrudes from the enclosure 1 and is protected by a cover 2 comprising a housing for the internal antenna A and which shuts off the enclosure 1. The cover 2 includes a main wall 21 which makes it possible to close the enclosure 1 while being parallel to the bottom 11 and a secondary wall 22 protruding from the main wall 21 inside which the internal antenna A is housed. Thus the secondary wall 22 has sufficient thickness to house the internal antenna 1.

Figure 1B:
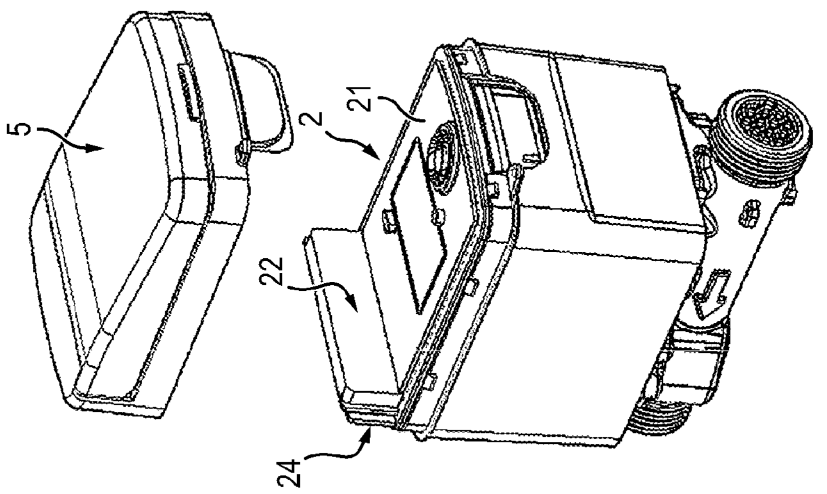
Figure 1A:
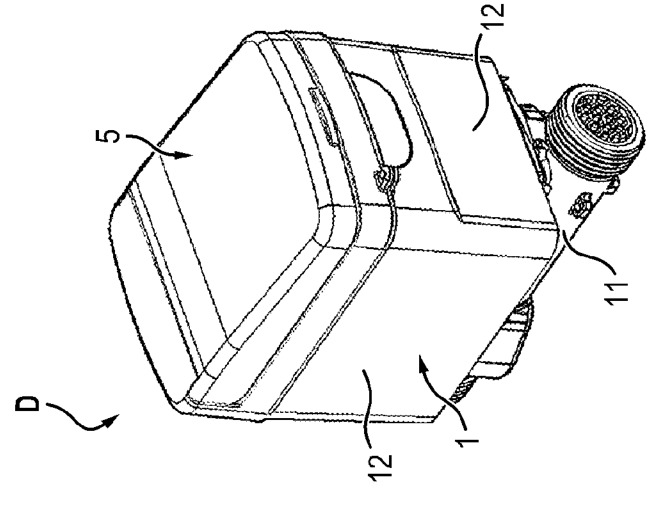
Figure 1E:
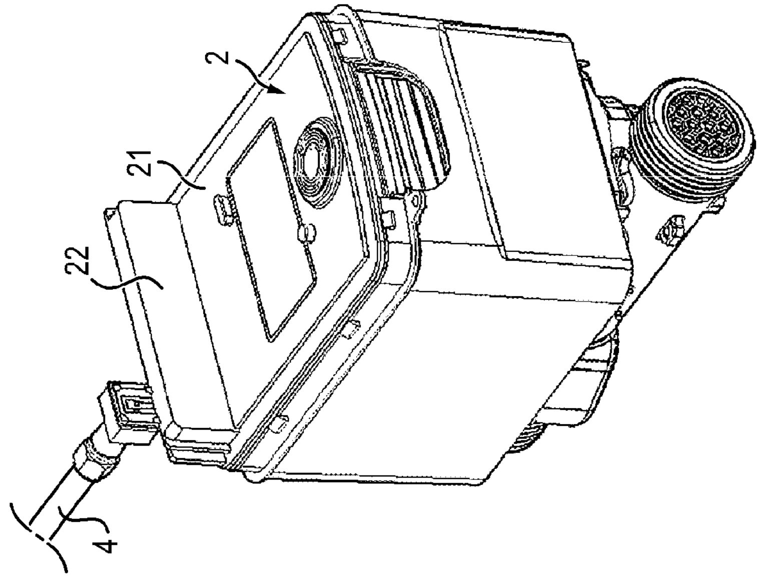
Figure 1D:
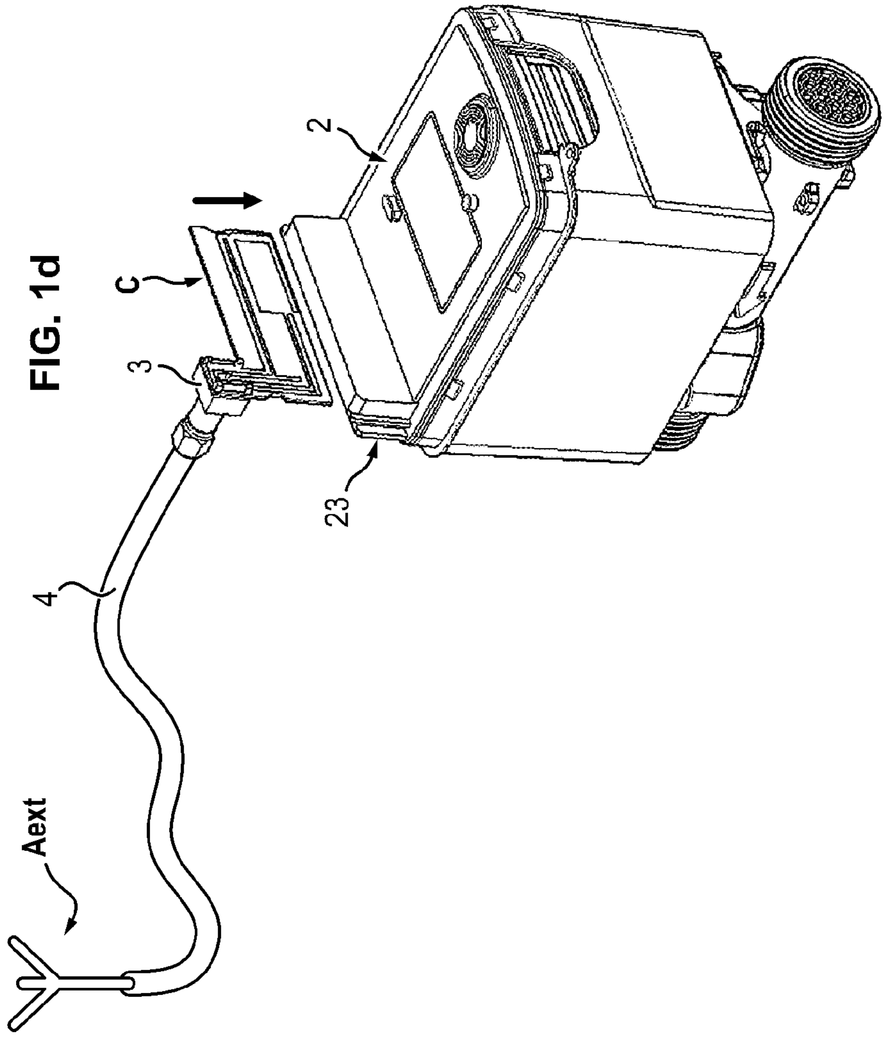

As illustrated in FIGS. 1*b*, 1*d* and 1*d*, the communicating device with the cover 2 and the enclosure 1 assembled does not allow the internal antenna A to be seen.

Complementarily, a lid 5 clip-fastens onto the cover 2 to protect the whole as illustrated in FIG. 1*a*.

The enclosure 1, the cover 2 and the lid 5 are preferably made of plastic. According to the application, the enclosure is filled with a waterproof protective gel to protect the electronics housed therein. This is because the communicating device may be used as a smart water meter and must be watertight.

The cover 2 includes, facing and distant from the secondary wall 22, an auxiliary wall 23. The secondary wall 22 and the auxiliary wall 23 together define a groove 24 which makes it possible to receive a coupler C which takes the form of a plate of overall rectangular shape. Such a coupler C is removable and is placed in the groove 24 facing the internal antenna A. The groove 24 also comprises elements for retaining the coupler C facing the internal antenna A. The coupler C is equipped, for example, with a coaxial connector 3 to which a coaxial cable 4 can be connected. An external antenna Aext is connected to the end of the coaxial cable. To connect the coupler to the external antenna Aext a suitable 50 Ohms connector should be provided.

The groove 24 and the secondary wall 22 have dimensions allowing the coupler C to be positioned at a distance from the antenna A between 1 and 5 mm, preferably 2 mm. In other words, it is a question of positioning the coupler C as close as possible to the antenna A to promote the coupling C of the signal radiated by the antenna A.

The groove 24 is moreover shaped to make it possible to accurately position the coupler C facing the antenna A so that the coupling is optimal with as few losses as possible.

Furthermore, the coupler C is a passive component which is not in electrical contact with the antenna A which makes it possible to avoid compromising the communicating device D. Specifically, to position the coupler C it is simply a question of placing it in the slot 24 provided for this purpose. It is therefore not necessary to dismantle it or to come into contact with the electronics inside. The protection index, denoted IP, is thus not altered.

Such a communicating device has two operating modes.

A first mode comprising the antenna A on its own which makes it possible to radiate a radio signal (see FIGS. 1*b* and 1*c*) or to receive a radio signal.

A second mode comprising the antenna A and the coupler C in such a way as to transfer the signal radiated by the antenna A to the external antenna (see FIGS. 1*d* and 1*e*). The transmission/reception of the radio signal is done via the external antenna Aext.

In this way it is possible to position the communicating device anywhere, the transmission/reception occurring at a distance from the communicating device.

The transition from one mode to the other does not require any software action or the presence of a switch. It is simply a question of positioning the coupler C in the groove 24 provided for this purpose.

Advantageously, the communicating device is such that it operates preferably within the bands LTE 20 and 8 (i.e. within the 800 MHz and 900 MHz bands). These bands are particularly used in the field of smart meters, for example for water meters. Alternatively, it is the definition of the coupler C and of the internal antenna A which makes it possible to adjust the operating bands.

Antenna A

Figure 2:
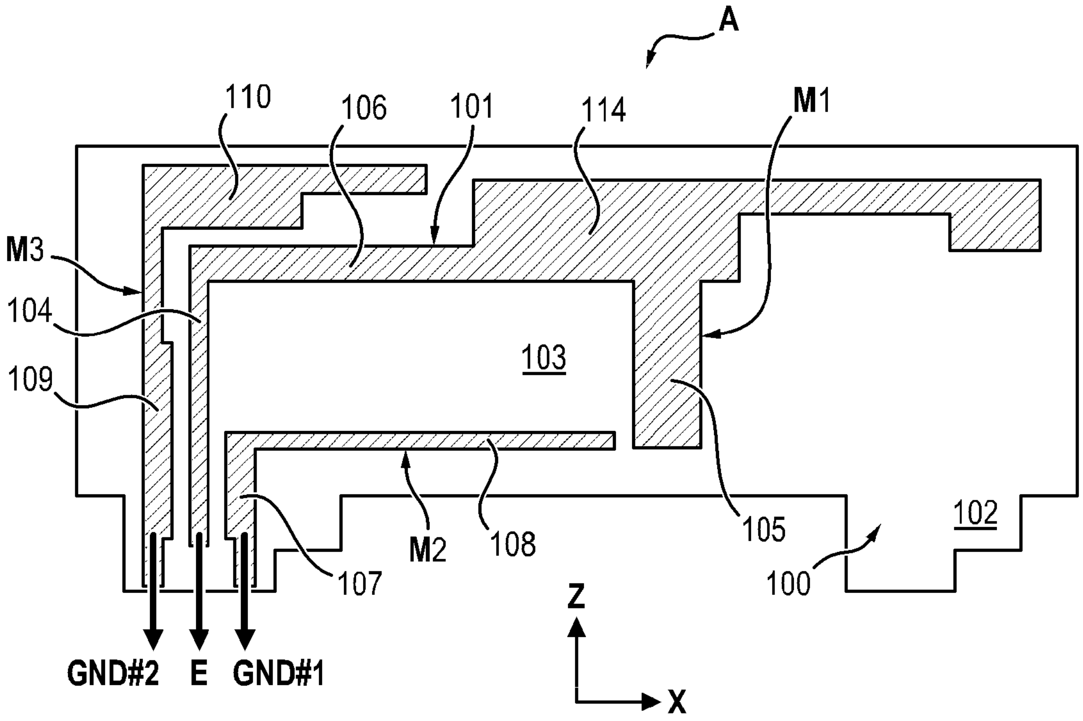
FIG. 2 illustrates an antenna in accordance with the invention.

FIG. 2 illustrates in detail an embodiment of the antenna A suitable for being incorporated into the communicating device D previously described.

The antenna A is a printed antenna comprising a substrate 100 made of dielectric material comprising a feed point E of the antenna A and a first grounding point GND #1 connected to a ground plane (not shown) of the antenna A. The feed point E is the input point of the radio signal that the antenna A must radiate (in the direction of transmission). The substrate 100 is of overall rectangular shape and extends along a transverse X and longitudinal Z direction.

On one side 102 of the substrate 100 is printed a metallic antenna element pattern 101. The metallic antenna element pattern 101 is for example copper and is printed using techniques well-known to those skilled in the art.

The metallic antenna element pattern 101 forms an open loop from the feed point E to the first grounding point GND #1, the loop defining at its center a non-metallic area 103. The fact that the antenna element pattern 101 forms an open loop (in fact almost closed) allows the radiation of the radio signal. (Furthermore, since the pattern 101 is an almost-closed loop, it allows the antenna to couple to the coupler C facing it.

The non-metallic area 102 is preferably rectangular. Other shapes may be envisioned.

The antenna A is suitable for operating, in transmission, alone to radiate a radio signal or in association with a coupler C disposed facing and distant from the antenna A in such a way as to pick up the signal radiated by the antenna A, the coupler C comprising, in this regard, a metallic area 203 complementary to the non-metallic area 103 facing it.

The antenna element pattern 101 has a shape which is suitable for the application envisioned in terms of operating frequencies.

According to the embodiment illustrated in FIG. 2, the antenna element pattern 101 comprises, from the feed point E, a first metallic integral pattern M1 composed of two longitudinal branches 104, 105 distant from one another, a transverse branch 106 connecting the two longitudinal branches 104, 105, a first longitudinal branch 104 extending from the feed point E, a second longitudinal branch 105 extending from the transverse branch 106 parallel to the first branch 104. This first pattern M1 is mainly U-shaped. The different branches composing the first pattern M1 have varied thickness.

A fourth branch 114 is here present in the extension of the transverse branch 106 of the U.

A second integral metallic pattern M2 extends from the first grounding point GND #1 connected to a ground plane. It comprises a longitudinal branch 107 extending from the first point GND #1 followed by a transverse branch 108 parallel to and distant from the transverse branch 105 of the first integral pattern M1, the transverse branch 107 of the second integral pattern (M2) terminating at a distance in the vicinity of 1 to 3 mm from the second longitudinal branch 105 of the first pattern M1 without touching it. In other terms, the second pattern M2 makes it possible to form with the first pattern M1 the open loop and are adapted according to the desired radiation for the antenna A.

A third metallic pattern M3 extends from a second grounding point GND #2 of the antenna A and makes it possible to adjust the adaptation of the antenna A: a longitudinal branch 109 extends from the second grounding point GND #2 followed by a transverse branch 110 which is parallel to the transverse branch 106 of the first pattern M1.

Coupler

Figure 3:
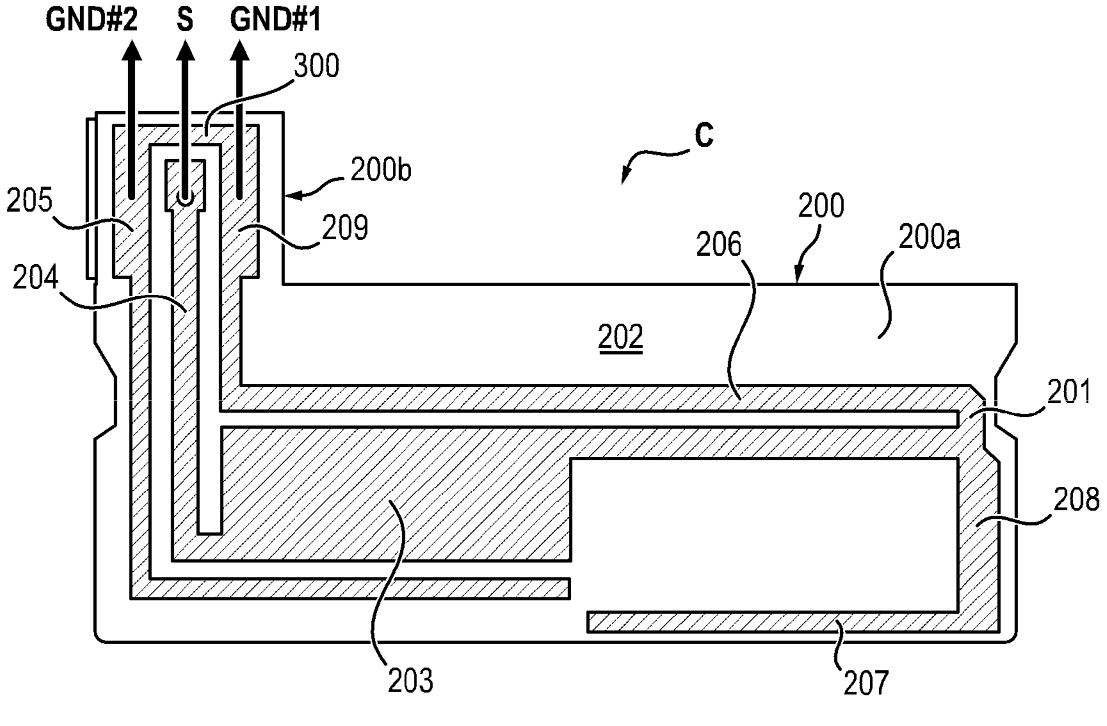
FIG. 3 illustrates a coupler in accordance with the invention.

FIG. 3 illustrates in detail an embodiment of a coupler C suitable for being incorporated into the communicating device D previously described.

The coupler C comprises a substrate 200 made of dielectric material and comprising a coupling pattern 201 printed on one side 202, the coupling pattern 201. The coupling pattern 201 comprises a metallic area 203 complementary to the non-metallic area 103 of the antenna A intended to be facing and distant from the coupler C in such a way that the coupler C picks up the signal radiated by the antenna A. The metallic area 203 is extended by a longitudinal branch which is connected by a connector 300 to an output S of the coupler C. The connector 300 is 50 Ohm-adapted.

The substrate 200 has a rectangular part 200*a* from which extends a tab 200*b* which makes it possible to connect a coaxial connector 3 of the coupler C and in particular to the output S of the coupler C. The connector 3 is placed on a side opposite to that on which the coupling pattern 201 is printed. The connector 3 is itself connected to a coaxial cable connected to the external antenna Aext.

The coupling pattern 201 therefore mainly has a rectangular metallic area 203 from which extend branches 204, 205, 206, 207, 208, 209 making it possible to adjust the adaptation of the coupler C and to provide the connections of the coupler C to the connector 3. The metallic area 203 is therefore surrounded by a loop. Longitudinal branches 205, 209 are printed on the substrate to face branches 107, 109 of the antenna A which are connected to the grounding points GND #1, GND #2. The branches 205, 209 also make it possible to detect the signal coming from the antenna A and thus improve the coupling.

The rectangular metallic area 202, when it is facing the non-metallic area of the antenna A, makes it possible to pick up the signal radiated by the antenna A and to convey it to the output S of the coupler (in transmission).

The shape of the metallic area is determined by the metallic area of the antenna A which must face it.

Antenna and Coupler

Figure 4:
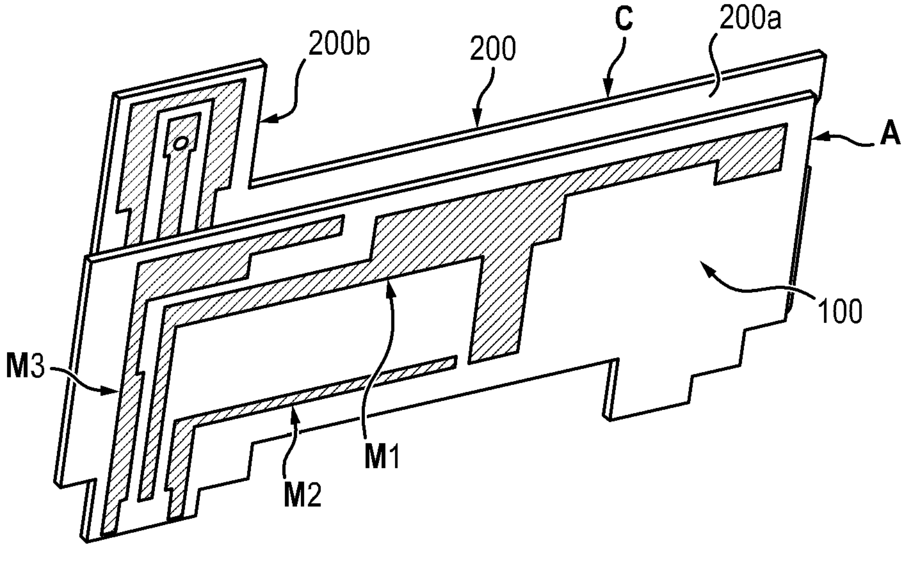
FIG. 4 illustrates a side view of the communicating device in accordance with the invention comprising both an antenna and a coupler facing it.

FIG. 4 illustrates the arrangement of the antenna A and of the coupler C. When the coupler C is positioned facing the antenna A, the grounding points of the antenna face grounding points of the coupler C which are those of the coaxial connector. Also, the branch 104 of the first pattern M1 connected to the input point of the antenna A faces the branch 204 connecting the metallic area 203 of the coupler C to the output point S of the coupler C. Moreover, the printed parts of course face one another.

Thus, the radio path is identical whether the antenna A is alone or with the coupler C.

Application

The device described above is advantageously used as a smart water meter and particularly when the location of the meter does not allow for a good radio ink (meter in the basement for example). In this case, it is of prime importance to be able to transfer the radio function to an external antenna judiciously located in such a way as to receive the radio signal.

Furthermore, a device in accordance with the invention has been produced and tested. In the mode with the antenna A alone, the measurement of the reflection parameter S11 does indeed cover the expected bands: LTE 20 and 8. When the antenna A operates with the coupler C the measured transmission losses S21 are acceptable (approximately 3 dB).

The invention claimed is:

1. A communicating device comprising a first housing for housing an antenna and a second housing for housing a coupler, the antenna comprising:

a substrate, a feed point of the antenna and a first grounding point intended to be connected to a ground plane;

a metallic antenna element pattern printed on one side of the substrate, the antenna element pattern forming an open loop from the feed point to the first grounding point, the loop defining in its center a non-metallic area;

the antenna being suitable for operating alone, in a first mode, to radiate a radio signal and a second mode in association with a coupler disposed facing and at a distance from the antenna, the coupler comprising a rectangular substrate comprising a coupling pattern printed on one side, the coupling pattern comprising a metallic area complementary to a non-metallic area of the antenna intended to be facing and distant from the coupler in such a way that the coupler picks up the signal radiated by the antenna, the first housing and the second housing being configured with respect to one another in such a way that the antenna and the coupler can face one another, the metallic area of the coupler then facing the non-metallic area of the antenna, the device comprising two operating modes:

a first operating mode comprising the antenna alone for radiating a radio signal, a second operating mode comprising the antenna and the coupler in such a way as to pick up the signal radiated by the antenna for transferring a radio signal radiated by the antenna to an external antenna suitable for being connected to the coupler.

2. The device as claimed in claim 1, wherein the antenna element pattern comprises, from the feed point, a first metallic integral pattern composed of two longitudinal branches distant from one another, a transverse branch connecting the two longitudinal branches, a first longitudinal branch extending from the feed point, a second longitudinal branch extending from the transverse branch parallel to the first branch, the antenna element pattern comprising a second integral pattern extending from the first grounding point and comprises a transverse branch parallel to and distant from the transverse branch of the first integral pattern, the transverse branch of the second integral pattern ending at a distance in the vicinity of 1 to 3 mm from the second longitudinal branch of the first pattern without touching it.

3. The device as claimed in claim 2, wherein the antenna comprises a second grounding point intended to be connected to a ground plane and comprises a third integral pattern extending from the second grounding point.

4. The device as claimed in claim 3, wherein the first pattern, the second pattern and the third pattern of the antenna are configured to operate in the bands LTE 20 and 8.

5. The device as claimed in claim 1, wherein the non-metallic area of the antenna is rectangular.

6. The device as claimed in claim 5, wherein the second housing is suitable for retaining the coupler facing and between 1 and 3 mm distant from the antenna.

7. The device as claimed in claim 1, wherein the coupler comprises a connector connected to the coupling pattern, the connector being suitable for being connected to an external antenna by means of a cable.

8. The device as claimed in claim 1, wherein the antenna is embedded in a cover and in which the housing for the coupler is a groove formed in the cover, the coupler being removable.

* * * * *